United States Patent [19]

Effer et al.

[11] Patent Number: 5,498,686

[45] Date of Patent: Mar. 12, 1996

[54] OPTICALLY TRANSPARENT PHOTOCHROMIC PLASTIC MATERIAL

[75] Inventors: Erhard Effer, Pöcking; Manfred Melzig, Wessling; Herbert Schuster, Emmering; Guiseppe Martinuzzi, Eichenau, all of Germany

[73] Assignee: Optische Werke G. Rodenstock, Munich, Germany

[21] Appl. No.: 352,627

[22] Filed: Dec. 9, 1994

Related U.S. Application Data

[63] Continuation-in-part of Ser. No. 50,005, Apr. 22, 1993, abandoned.

[30] Foreign Application Priority Data

Aug. 21, 1993 [DE] Germany .............. 41 27 810.043

[51] Int. Cl.$^6$ .................. C07D 265/02; C07D 265/04; C07D 265/12
[52] U.S. Cl. ............................. 528/76; 528/59; 544/71; 544/72
[58] Field of Search ............ 528/76, 59; 544/71, 544/72

[56] References Cited

U.S. PATENT DOCUMENTS

| | | | |
|---|---|---|---|
| 4,720,547 | 1/1988 | Kwak et al. | 544/71 |
| 4,785,097 | 11/1988 | Kwak | 544/71 |
| 4,816,584 | 3/1989 | Kwak et al. | 544/71 |
| 4,831,142 | 5/1989 | Kwak | 544/71 |
| 4,909,963 | 3/1990 | Kwak et al. | 252/586 |
| 5,130,353 | 7/1992 | Fischer et al. | 524/43 |
| 5,221,721 | 6/1993 | Selvig | 526/193 |
| 5,244,602 | 9/1993 | Van Gemert | 252/589 |
| 5,340,857 | 8/1994 | Van Gemert | 524/110 |
| 5,374,723 | 12/1994 | Yamamoto et al. | 544/71 |

*Primary Examiner*—W. Robinson H. Clark
*Attorney, Agent, or Firm*—Antonelli, Terry, Stout & Kraus

[57] ABSTRACT

An optically transparent photochromic plastic material is described which is comprised of materials with a sulphur content and which via polymerization processes contains photochromic organic compounds as solid ingredients, which possess at least two ring systems linked via carbon atom and whose photochromic tint is based on a reversible bond rupture to the spiro-C atom.

6 Claims, No Drawings

OPTICALLY TRANSPARENT PHOTOCHROMIC PLASTIC MATERIAL

This application is a continuation-in-part of U.S. Ser. No.: 08/050,005, filed Apr. 22, 1993, now abandoned.

TECHNICAL BACKGROUND

The invention relates to an optically transparent photochromic plastic material which can preferably be used for ophthalmic lenses with or without optical power, for example, for sun protection purposes, but also for other photochromic articles such as sun protection elements, for example vehicle roofs.

STATE OF THE ART

In ophthalmic optics the plastic material currently most frequently used for ophthalmic lenses is polydiethylene glycol bisallyl carbonate.

This material can only be dyed with photochromic dyestuffs in a subsequent process as the radical starter, normally an organic peroxide, required for polymerization in a high concentration (4–8%) irreversibly destroys the photochromic molecules during the hardening process.

Processes for the dyeing of polydiethylene glycol bisallyl carbonate and other plastic materials used in ophthalmic optics are described for example in FR 25 87 501, DE 25 35 300, U.S. Pat. No. 4,300,821 or U.S. Pat. No. 4,578,305. However, none of these processes have found any practical application.

A further process for the subsequent dyeing of plastic materials is described in DE 35 16 568. Whilst this process possesses a number of advantages, photochromic plastic articles subsequently dyed in this or other processes have the disadvantage that the useful life of the dyestuffs is low.

The most important factor in the degradation of—particularly photochromic—dyestuffs is the destruction by singlet oxygen. Due to the only very low dyeing depth of 10–100 μm in a subsequent dyeing process, the diffusion barrier for atmospheric oxygen is relatively small so that the dyestuffs are attacked by diffused oxygen.

This disadvantage could be overcome by a "solid dyeing" of the plastic materials as with "solid dyed" articles the diffusion barrier for the greatest part of the dyestuff is substantially larger than with "surface dyed" articles.

Whilst plastic materials are already known which allow solid dyeing, most of these optically transparent plastics are less suitable for ophthalmological purposes for different reasons:

Due to its low surface hardness, the "solid dyeable" plastic polymethyl methacrylate (PMMA) is only used in "disposable" spectacles or for dummy lenses for frame demonstration purposes.

Polycarbonate, which is used as a safety plastic lens due to its excellent impact resistance, possesses both insufficient scratch resistance and a dispersion which is too high for lenses with optical power ($v_e$=30).

EU-A 294 056 describes the manufacture of photochromic plastic lenses on the base of polyurethanes. However, products manufactured in accordance with this process or those processes described in the older publications of the Asahi Glass Comp. (JP 59 135152) or of Baltzers (U.S. Pat. No. 3,508,810) all possess the disadvantage of multilayer systems.

This is especially striking in the field of the ophthalmological industry. The use of glass as the base material for photochromic sun protection lenses is hardly meaningful as exceptional mineral glass products (DE 2 609 468) already exist on the market and the main advantage of plastic lenses, their low weight, would be lost in such compound systems.

The use of polyurethane films between two plastic lenses as proposed in the above EU-A 294 056 is a very complicated and, due to the difficulty of the adhesion of the layers to each other, unsatisfactory process which leads to high reject rates because of the processes usual in ophthalmic lens production of washing, tinting and anti-reflection coating. If the casting molds made from plastic or glass are not finished, a time-consuming and expensive process, then cosmetically unusably thick lenses are produced as the casting molds, depending on their material, have to possess a minimum thickness of 1–2 mm if no thermal deformation is to be accepted. And this again leads to unusable products for lenses with optical power.

REPRESENTATION OF THE INVENTION

The object of the invention is to specify an optically transparent photochromic plastic material which can be used universally and which allows solid-dyeing with dyestuffs and in particular with photochromic dyestuffs. Moreover, a process for solid-dyeing is to be specified.

A solution to this object is characterized with its further refinements in the patent claims.

In accordance with the invention an optically transparent photochromic plastic material is specified which consists of materials with a sulphur content and which via polymerization processes contains as solid ingredients monomers of photochromic organic compounds which possess at least two ring systems linked via a spiro carbon atom and whose photochromic tint is based on a reversible bond rupture to the spiro-C atom.

In accordance with the invention it was found that different photochromic dyestuffs produce superb solid tints with an excellent useful life in plastic materials with a sulphur content such as are described, for example, in US 4,689,387, EU 268 896 and EU 235 743. This finding does not only apply in comparison to other materials, but also in comparison to surface-tinted lenses in the same material.

This is surprising for the reason that, for example, the aromatic diallyl compounds described in U.S. Pat. No. 4,602,075 as Examples 1 and 5 only produce brown-tinted lenses without any photochromic reaction when 0.15% by weight of the photochromic compound spiro (3-ethyl-1, 3, 5 trimethyl indoline-2, 2-(2H) (1,4) benzoxazine is added.

This is because the polymerization initiator diisopropyl peroxidicarbonate added in 1.2% by weight in this process also destroys the photochromic dyestuff here as with CR 39.

Trials with the mixtures 1 and 7 described in U.S. Pat. No. 4,632,969 of monofunctional aromatic allyl carbonates and diallyl phthalates with the addition of 0.3% of benzoyl peroxide and the above dyestuff produce lenses with a yellow to ochre tint with only a weakly recognizable photochromic effect. As the pre-tint and impairment depend on the polymerization process, and as this in turn stands in relation to the lens thickness and power, tints are produced which are not uniform and which are unusable particularly for lenses with optical power.

Dip-tints in dyeing baths such as are normally performed with lenses made from polydiethylene glycol bisallyl carbonate at 90°–95° C. are not possible with lenses in the high index plastic material used. Due to swelling of the surface, structures are generated on the surface which makes the lenses unusable for optical purposes.

For the lenses used in the examples and the comparison examples photochromic compounds were selected from the following "classes":

Class I: Spiro [indolino-2,2' (2H) 1,4 oxazines]

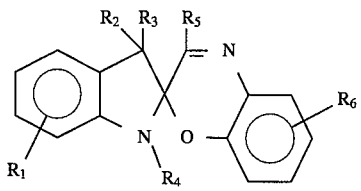

Class II: Spiro [adamantane-2,2' (2H) pyranes]

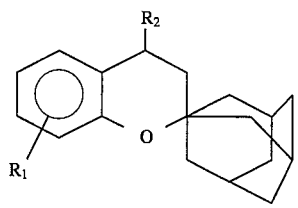

Class III: Spiro [fluorene-9,1'-(1,8a)dihydroindolizines]

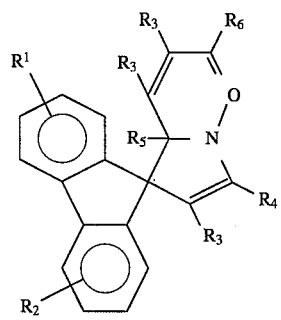

Class IV: Non-spiro-linked (2H) pyranes

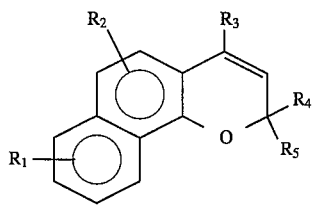

$R_1$ –$R_9$ represent the substitutes specified in the relevant professional and patent literature.

TABLE 1

Photochromic compounds used
(Class; used in example ...;
concentration)

A  Spiro[3-ethyl 1,3-dimethyl indoline 2,2'-7"-methoxy napthth[1,2-e](1,4)oxazine]
    (I; 1, 11, 16, 21, 24, 27, 30; 440 ppm)
B  Spiro[1,3,3-trimethyl indoline 2,2'-5',7"-dimethoxybenz(1,4)oxazine]
    (I; 2, 12, 17; 800 ppm)
C  Spiro[2,7-dibromofluorene 9,1'-2',3'-diacetyl 4'-aza-5',8'-dimethyl(1,8a)dihydroindolizine]
    (III; 3, 13, 18; 500 ppm)
D  Spiro[fluorene 9,1'-4'-aza-2',3'-dicyano(1,8a) dihydroindolizine]
    (III); 4, 14, 19, 22, 25, 28; 90 ppm)

TABLE 1-continued

Photochromic compounds used
(Class; used in example ...;
concentration)

E  2-methyl 2-(4-piperidylphenyl)-4'-methyl naphtho[1,2–6](2H)pyrane]
    (IV; 5, 115, 20; 600 ppm)
F  Spiro[1,3,3,5,6-pentamethyl indoline 2,2-isochinolino [5,6-e](1,4)oxazine]
G  Spiro[adamantane 2,2,-4"-chloronaphtho(2,1-e](2H) pyrane]
    (II: 7, 23, 26, 29; 1000 ppm)
H  Spiro(fluorene 9,1'-2'-3'-diacetyl 4'-aza-5',7'-dimethyl(1,8a)dihydroindolizine]
    (III; 8; 400 ppm)
I  Spiro[2-bromofluorene 9,1'-2'-3' diacetyl 4'-aza(1,8a) dihydroindolizine]
    (III); 9; 800 ppm)
K  Spiro[1,3,3-trimethylindoline 2,2'-4"-piperidyl 7"-methoxynaphth[1,2-e](1,4)oxazine]
    (I; 10; 400 ppm)

TABLE 2

Optical Data of Lenses 1–20

| Example | $\tau_o$ (%) | $\tau_s$ (%) | $\lambda_{max}$ (nm) | Color Impression |
|---|---|---|---|---|
| 1 | 88.9 | 36.4 | 610 | Royal blue |
| 2 | 89.0 | 25.2 | 555 | Red-violet |
| 3 | 76.9 | 42.1 | 635 | Green |
| 4 | 86.4 | 22.8 | 552 | Red-violet |
| 5 | 89.1 | 40.6 | 570 | Violet |
| 6 | 85.8 | 34.4 | 622 | Greenish blue |
| 7 | 89.7 | 86.2 | 445 | Orange-yellow |
| 8 | 79.2 | 28.0 | 635 | Deep green |
| 9 | 89.5 | 33.0 | 530 | Red |
| 10 | 89.2 | 35.5 | 575 | Violet |
| 11 | 89.6 | 69.1 | 610 | Light blue |
| 12 | 89.3 | 75.7 | 555 | Pink-red |
| 13 | 82.1 | 74.9 | 633 | Light green |
| 14 | 88.9 | 46.2 | 551 | Red-violet |
| 15 | 89.5 | 77.9 | 570 | Lilac |
| 16 | 91.5 | 32.5 | 608 | Royal blue |
| 17 | 91.6 | 48.3 | 550 | Violet-red |
| 18 | 90.8 | 75.5 | 630 | Light green |
| 19 | 91.2 | 22.0 | 546 | Deep violet-red |
| 20 | 91.8 | 57.8 | 565 | Violet |

Annotations:
$\tau_o$: The transmission of an unexposed lens at 23° C., evaluated according to the spectral sensitivity of the human eye ($V_\lambda$).
The unexposed state is obtained by heating the lens for 30 minutes at 80° C. in the dark and a subsequent cooling of the lens for 30 minutes in the dark.
$\tau_s$: The transmission of the exposed lens according to $V_\lambda$
The exposed state is obtained by exposing the lens to the radiation of a Xenon high pressure lamp for 15 minutes at 23° C. in approximation to DIN 58217 (60 KLUX).
$\lambda_{max}$: Longwave absorption maximum of the exposed lens.
Color Impression: Of the exposed lens near to $\tau_s$.
Note:
1. The green color impression of the lenses dyed with the compounds C and H is caused by a further absorption around 440 nm.
2. The low spectral sensitivity of the human eye around 445 nm does not allow any darkening to take place despite the intensive dyeing (Example 7). The further evaluation was therefore not performed according to $V_\lambda$, but at the wavelength $\lambda$ = 445 nm ($\tau$(445 nm = 40.3%).

The color depth ($\tau$s) of lenses 1–10 can be adjusted to almost any value using the concentration of the photochromic dyestuff as the solubility of most of the compounds investigated is well above 1500 ppm in the aromatic component of the casting resin mixture.

With the surface tints of lenses 11–20 the free room to deeper tints is now only very small as twice or thrice the concentration of the photochromic dyestuff in the lacquer produces $\tau_s$ values only a few per cent lower. A further increase in the concentration is not possible as due to the crystallization of the dyestuff in the lacquer (oversaturated solution in pre-drying) non-uniform. scotto tints result.

TABLE 3

Results of the service life test

| Example | $\Delta\tau$ (ch) | $\Delta\tau$ (xh) | | Destruction Rate $\gamma$ |
|---|---|---|---|---|
| 1 | 52.5 | 50.8 | (100) | $3.2 \cdot 10^{-4}$ |
| 2 | 63.8 | 58.2 | (100) | $8.8 \cdot 10^{-4}$ |
| 3 | 34.8 | 9.4 | (100) | $4.4 \cdot 10^{-3}$ |
| 4 | 63.6 | 15.8 | (25) | $3.0 \cdot 10^{-2}$ |
| 5 | 48.5 | 10.4 | (25) | $3.1 \cdot 10^{-2}$ |
| 6 | 51.4 | 48.9 | (100) | $4.8 \cdot 10^{-4}$ |
| 7* | 49.6 | 29.6 | (25) | $1.6 \cdot 10^{-2}$ |
| 8 | 51.2 | 27.6 | (100) | $4.6 \cdot 10^{-3}$ |
| 9 | 56.5 | 18.2 | (25) | $2.7 \cdot 10^{-2}$ |
| 10 | 53.7 | 32.4 | (100) | $4.0 \cdot 10^{-3}$ |
| 11 | 20.5 | 7.8 | (100) | $6.2 \cdot 10^{-3}$ |
| 12 | 13.6 | 6.4 | (50) | $1.1 \cdot 10^{-2}$ |
| 13 | 8.8 | 2.9 | (2) | 0.34 |
| 14 | 42.7 | 4.8 | (1) | 0.39 |
| 15 | 11.6 | <2.0 | (1) | >0.84 |
| 16 | 59.0 | 37.3 | (100) | $3.7 \cdot 10^{-3}$ |
| 17 | 43.3 | 19.9 | (100) | $5.4 \cdot 10^{-3}$ |
| 18 | 15.3 | 5.7 | (4) | 0.16 |
| 19 | 69.2 | 6.0 | (2) | 0.46 |
| 20 | 34.0 | 7.2 | (1) | 0.79 |

*Note: Evaluated at $\lambda$ = 445 nm.
Annotations:
$\Delta\tau$ (ch) = $\tau_S(V) - \tau_O(V\lambda)$ at the beginning of the test
$\Delta\tau$ (xh) = $\tau_S(V) - \tau_O(V\lambda)$ after x hours of irradiation (130 klux; 40° C.; Xenon high pressure radiator)

Destruction Rate = $\frac{\Delta\tau(ch) - \Delta\tau(xh)}{x \cdot \Delta\tau(ch)}$ characterizes the loss in photochromic power (reversible darkening) per hour of irradiation as evaluated by the human eye (with the exception of Example 7).

With the mathematically determined value $\lambda$ a linear—and not an exponential—course of the destruction is assumed. The value therefore corresponds to the averaged, not the initial loss per hour of irradiation for x ≠1.

In comparison to the surface tinting of the plastic material diethylene glycol bisallyl carbonate most frequently used for ophthalmic lenses, the destruction rate $\gamma$ in the process in accordance with the invention is 1/6 to 1/40 depending on the photochromic compound, and in comparison to the surface tinting of the same (high index) material only 1/15 to 1/80.

The useful service life of a photochromic plastic lens is thus increased over the products already known and in part existing on the market from, for example, 2 months to 1–7 years. For some of the photochromic compound classes investigated, further additional protective measures are required for practical use, e.g. the addition of anti-oxidants (HALs) or singlet oxygen extinguishers (Ni complexes) to the cast mixture or the subsequent evaporation with comparatively gastight anorganic films such as quartz which represents an ingredient of almost all antireflection coatings on plastic lenses.

TABLE 4

Characteristic Kinetic Values of Lenses 1,4,7 and 21–29

| Example | $\tau_O$ (%) | $\tau_S$ (%) | $T_A$ (x/y) | $T_{AM}$ |
|---|---|---|---|---|
| 1 | 88.9 | 36.4 | 30/2.8 | 10.71 |
| 4 | 86.4 | 22.8 | 10/6.1 | 1.64 |
| 7* | 89.7 | 40.3 | 20/6.4 | 3.13 |
| 21 | 89.1 | 38.7 | 30/3.2 | 9.38 |
| 22 | 86.7 | 26.4 | 10/6.5 | 1.54 |
| 23* | 89.7 | 41.4 | 20/7.4 | 2.70 |
| 24 | 88.7 | 35.6 | 30/2.6 | 11.54 |
| 25 | 86.2 | 21.9 | 15/8.7 | 1.72 |
| 26* | 89.5 | 40.7 | 20/5.8 | 3.45 |
| 27 | 88.4 | 33.2 | 40/3.1 | 12.90 |
| 28 | 85.7 | 20.1 | 15/8.2 | 1.83 |
| 29* | 89.5 | 40.1 | 20/5.2 | 3.85 |
| 30 | 88.2 | 31.7 | 30/2.4 | 14.3 |

*Evaluated at $\lambda$ = 445 nm
Annotations
$T_A$ is the measured fading $\Delta\tau$ (V$\lambda$) by x % in y minutes
$\Delta\tau = \tau_S - \tau$ (y)
After an exposure as described previously of 15 minutes, the irradiation light source is uncoupled and the lens left to fade increase in transmission (by means of V$\lambda$ or 445 nm interference filters) is observed.
$T_{AM}$ is the fading in % per minute $$T_{AM} = \frac{\Delta\tau}{y}$$

The changes to the composition have no measurable influence on hardened plastic matrix and of the cast mixture the polarity of the color of the photochromic effect.

However, the influence on the fading behavior of the photochromic compounds is clearly recognizable. This also depends to a large extent on the photochromic compound selected. For example, the difference in $T_{AM}$ for the transition from the standard material (1, 4, 7) to the material of examples (27–29) is only Just–12% for compound D, whereas for compound G it is more than–23%.

In the following the invention is described more closely using examples:

EXAMPLE 1

At room temperature and with humidity excluded, 1.84 parts by weight of dibutyl stannic dilaurate, 0.2 parts by weight of the photochromic compound A and 1000 parts by weight of m-xylylene diisocyanate are mixed, then 2.3 parts by weight of a parting compound on a silicone base and 1300 parts by weight of pentaerythrite tetracis 3-mercaptopriopionate are added and stirred to a homogeneous mixture. The mixture is filtered (1µ) and cooled to 285 K. The cooled solution is liberated from oxygen by multiple evacuation and venting with argon and poured into a mould. This comprises two glass mould halves and a ring made from polypropylene.

After a rest period of 24 h at room temperature heating to 318 K is performed. After 3 h of polymerization at this temperature, heating to 333 K. is performed, after a further 2 h to 353 K. This temperature is maintained for a further 2 h. After the mould has cooled to approx. 340 K., the ring is pulled off and the finished lens removed.

EXAMPLES 2–10

The lenses were manufactured under the same conditions with the concentrations of different photochromic compounds given in Table 1.

COMPARISON EXAMPLES 11–15

White lenses were manufactured as in Example 1 without the addition of photochromic compounds. The lenses were surface tinted in accordance with the lacquer described as a version example in DE 3516568 with the addition of 1.5 per cent by weight of the photochromic compounds A-E at 323 K for 30 minutes.

COMPARISON EXAMPLES 16–20

Commercially available plano lenses (71 mm; centre thickness 2 mm) made from polydiethylene glycol bisallyl carbonate were surface tinted according to the same process as in comparison example 16–20.

The optical data of these lenses 1–20 are collected in Table 2.

The lenses were subjected to a Xenon light permanent strain test Suntest of the company Original Hanau for 100 h. The results before and after exposure are collected in Table 3.

Furthermore, it was discovered in accordance with the invention that comparatively slight modifications which have practically no effect on the mechanical and optical data have a great influence on the service life and in particular on the fading behavior of photochromic dyestuffs.

EXAMPLES 21–23

By the replacement of 207 parts by weight of m-xylylene diisocyanate with 178 parts by weight of mesitylene triisocyanate photochromic lenses were manufactured in otherwise the same way as in Examples 1, 4 and 7.

EXAMPLES 24–26

By the replacement of 213 parts by weight of the tetrafunctional thiol in Example 1 by 229 parts by weight of the trifunctional thiol triethanolamine tris-3-mercaptopropionate photochromic lenses were manufactured An otherwise the same was as in Examples 1, 4 and 7.

EXAMPLES 27–29

By the replacement of 141 parts by weight of m-xylylane diisocyanate by 200 parts by weight of tolylene isocyanate and the replacement of 192 parts by weight of pentaerythrite tetracis-3-mercaptopropionate by 214 parts by weight of triethanolamine tris-3-mercaptopropionate photochromic lenses were manufactured in otherwise the same way as in Examples 1, 4 and 7.

EXAMPLE 30

By the replacement of 1,000 parts by weight of m-xylylene diisocyanate by 1,000 part by weight of norbornane diisocyanate and 1300 parts by weight of pentaerythrite tetracis-3-mercaptopropionate by 840 parts by weight of 4-mercaptomethyl-3,6-dithia-1, 8-octanedithiol photochromic linses were manufactured in otherwise the same manner as in Examples 1, 4 and 7.

A replacement of the tetrafunctional thiols by diols and triols is possible and also accelerates the fading; however, the refractive index is also reduced in this process insofar as more than relatively 10% of the thiol is replaced.

The optical and kinetic data of these lenses in comparison to Examples 1, 4 and 7 are summarized in Table 4.

We claim:

1. Optically transparent polythiourethane photochromic plastic material comprising;

a solid photochromic organic compound having at least two ring systems linked via a spiro carbon atom, wherein a photochromic tint occurs due to reversible bond rupture to the spiro carbon atom, and a copolymerized sulfur containing compound, containing of at least one polyisocyanate monomer selected from the group of m-xylylene diisocyanate, mesitylene triisocyanate, tolylene isocyanate and norbornane diisocyanate and at least one polythiol monomer selected from the group of pentaerythrite tetracis-3-mercaptopropionate, triethanolamine tris-3mercaptopropionate and 4-mercaptomethyl-3,6-dithia-1,8octanedithiol.

2. A process for manufacturing a photochromic plastic material comprising, adding a solid photochromic organic compound having at least two ring systems linked via a spiro carbon atom, wherein a photochromic tint occurs due to reversible bond rupture to the spiro carbon atom, to dibutyl stannic dilaurate and m-xylylene diisocyanate at room temperature and with humidity excluded, adding a parting compound a silicone base and pentaerythrite tetracis 3-mercaptopriopionate to form a mixture, filtering the mixture and cooling the mixture to about 285° K., degassing the mixture and venting with an inert dry gas, pouring the mixture into a mold, heating the mixture to about 318° K. for about three hours, heating the mixture to about 333° K. for about two hours, heating the mixture to about 353° K. for about two hours, cooling the mixture to about 340° K., and removing an article from the mold.

3. A process for manufacturing a photochromic plastic material according to claim 2, wherein the mixture is in the mold for approximately 24 hours before heating.

4. Optically transparent polythiourethane photochromic plastic material produced by the process of claim 2.

5. A process for manufacturing a photochromic plastic material comprising mixing a photochromic organic compound having at least two ring systems linked via a spiro carbon atom, wherein a photochromic tint occurs due to reversible bond rupture to the spiro carbon atom, with a polyisocyanate and a polythiol to form a liquid mixture, and polymerizing the liquid mixture to form a solid optically transparent polythiourethane photochromic plastic material.

6. Solid optically transparent polythiourethane photochromic plastic material produced by the process of claim 5.

* * * * *